(12) United States Patent
Kaneichi et al.

(10) Patent No.: US 11,270,585 B2
(45) Date of Patent: Mar. 8, 2022

(54) DISPLAY CONTROL METHOD FOR DEMAND FORECAST INFORMATION, DISPLAY CONTROL DEVICE, AND STORAGE MEDIUM STORING DISPLAY CONTROL PROGRAM

(71) Applicants: TOYOTA JIDOSHA KABUSHIKI KAISHA, Toyota (JP); JapanTaxi Co., Ltd., Chiyoda-ku (JP)

(72) Inventors: Daiki Kaneichi, Nissin (JP); Yuichi Komatsu, Yokohama (JP); Kiichi Ueta, Bunkyo-ku (JP)

(73) Assignees: TOYOTA JIDOSHA KABUSHIKI KAISHA, Toyota (JP); JapanTaxi Co., Ltd., Chiyoda-ku (JP)

( * ) Notice: Subject to any disclaimer, the term of this patent is extended or adjusted under 35 U.S.C. 154(b) by 0 days.

(21) Appl. No.: 16/666,531

(22) Filed: Oct. 29, 2019

(65) Prior Publication Data

US 2020/0135027 A1  Apr. 30, 2020

(30) Foreign Application Priority Data

Oct. 31, 2018 (JP) .............................. JP2018-204816

(51) Int. Cl.
| | | |
|---|---|---|
| G08G 1/00 | (2006.01) | |
| G08G 1/13 | (2006.01) | |
| G08G 5/06 | (2006.01) | |
| G06Q 10/04 | (2012.01) | |
| G06T 3/40 | (2006.01) | |

(52) U.S. Cl.
CPC ............... *G08G 1/13* (2013.01); *G06Q 10/04* (2013.01); *G06T 3/40* (2013.01); *G08G 1/202* (2013.01);
(Continued)

(58) Field of Classification Search
CPC .......... G08G 5/065; G08G 1/202; G08G 1/13; G08G 1/065; G06Q 50/30; G06Q 10/04; G06F 16/9038
See application file for complete search history.

(56) References Cited

U.S. PATENT DOCUMENTS

| | | | |
|---|---|---|---|
| 2009/0187464 A1* | 7/2009 | Bai ........................ | G06Q 10/04 705/7.34 |
| 2012/0158290 A1* | 6/2012 | Bharathan ............ | G01C 21/367 701/425 |

(Continued)

FOREIGN PATENT DOCUMENTS

| | | |
|---|---|---|
| JP | 3-210418 A | 9/1991 |
| JP | 2005-147792 A | 6/2005 |

(Continued)

*Primary Examiner* — Phong X Nguyen
(74) *Attorney, Agent, or Firm* — Oblon, McClelland, Maier & Neustadt, L.L.P.

(57) ABSTRACT

A display control method for displaying demand forecast information includes: calculating a predicted number of pick-ups based on demand forecast information of a forecast target area and vacant taxi information, and displaying the calculated predicted number of pick-ups on a map screen, when a magnification for displaying map information is equal to or smaller than a first magnification, and displaying demand forecast information of the forecast target area on the map screen when the magnification is equal to or larger than a second magnification that is larger than the first magnification.

7 Claims, 5 Drawing Sheets

(52) U.S. Cl.
CPC .... *G08G 5/065* (2013.01); *G06T 2207/20016* (2013.01); *G06T 2207/20021* (2013.01); *G06T 2219/2016* (2013.01)

(56) References Cited

U.S. PATENT DOCUMENTS

| | | | |
|---|---|---|---|
| 2013/0144831 A1* | 6/2013 | Atlas | G06Q 10/06 706/50 |
| 2015/0039391 A1* | 2/2015 | Hershkovitz | G06Q 50/30 705/7.31 |
| 2015/0228192 A1* | 8/2015 | Kawamoto | G08G 1/202 701/537 |
| 2016/0300170 A1* | 10/2016 | Sun | G06Q 10/06315 |
| 2016/0335576 A1* | 11/2016 | Peng | G06Q 10/06315 |
| 2018/0096606 A1* | 4/2018 | Moreira-Matias | G08G 1/202 |
| 2018/0130356 A1* | 5/2018 | Zhang | G08G 1/202 |
| 2018/0341888 A1* | 11/2018 | Kislovskiy | G08G 1/096838 |
| 2018/0364062 A1* | 12/2018 | Wang | G01C 21/3492 |
| 2019/0057478 A1* | 2/2019 | Mu | G06Q 50/30 |
| 2019/0266625 A1* | 8/2019 | Kikuchi | G06Q 30/0205 |
| 2020/0202365 A1* | 6/2020 | Yamashiro | G06Q 10/06 |
| 2021/0356972 A1* | 11/2021 | Kwon | G05D 1/0287 |

FOREIGN PATENT DOCUMENTS

| | | | | |
|---|---|---|---|---|
| JP | 2008-65396 A | | 3/2008 | |
| JP | 2009-009282 A | | 1/2009 | |
| JP | 2016-75972 A | | 5/2016 | |
| JP | 02020027477 A | * | 2/2020 | ............ G08G 1/123 |
| WO | WO 2015/198593 A1 | | 12/2015 | |

* cited by examiner

DISPLAY CONTROL METHOD FOR DEMAND FORECAST INFORMATION, DISPLAY CONTROL DEVICE, AND STORAGE MEDIUM STORING DISPLAY CONTROL PROGRAM

INCORPORATION BY REFERENCE

The disclosure of Patent Application No. 2018-204816 filed on Oct. 31, 2018 including the specification, drawings and abstract is incorporated herein by reference in its entirety.

BACKGROUND

1. Technical Field

The disclosure relates to a display control method for displaying demand forecast information, a display control device, and a storage medium storing a display control program.

2. Description of Related Art

Japanese Unexamined Patent Application Publication No. 2009-9282 (JP 2009-9282 A) describes a technology for displaying demand forecast information of taxi dispatch in mesh units set in advance.

SUMMARY

According to the technology described in JP 2009-9282 A, when the mesh unit is large, there may be a case where a taxi dispatched to an area corresponding to the mesh indicating high demand can not pick up a passenger who requests a dispatch of a taxi.

The disclosure provides a display control method for displaying demand forecast information, a display control device, and a storage medium storing a display control program that allow a taxi to reliably pick up a passenger who requests a dispatch of a taxi.

A first aspect of the disclosure relates to a display control method for displaying demand forecast information. The display control method includes: calculating a predicted number of pick-ups based on demand forecast information and vacant taxi information of a forecast target area, and displaying the calculated predicted number of pick-ups on a map screen, when a magnification for displaying map information is equal to or smaller than a first magnification, and displaying demand forecast information of the forecast target area on the map screen when the magnification is equal to or larger than a second magnification that is larger than the first magnification.

In the above aspect, the display control device for demand forecast information may switch the magnification from the first magnification to the second magnification at a timing when a host vehicle enters a high demand area and/or within a range of a predetermined distance from a destination.

In the above aspect, the display control device for demand forecast information may display a recommended traveling direction of a host vehicle in accordance with a demand forecast, when the magnification is equal to or larger than the second magnification.

A second aspect of the disclosure relates to a display control device for displaying demand forecast information. The display control device includes a memory and a hardware processor. The processor is configured to calculate a predicted number of pick-ups based on demand forecast information and vacant taxi information of a forecast target area, and to display the calculated predicted number of pick-ups on a map screen, when a magnification for displaying map information is equal to or smaller than a first magnification. The processor is configured to display demand forecast information of the forecast target area on the map screen when the magnification is equal to or larger than a second magnification that is larger than the first magnification.

A third aspect of the disclosure relates to a storage medium storing a display control program for displaying demand forecast information. The program causes a computer to execute the following: calculating a predicted number of pick-ups based on demand forecast information and vacant taxi information of a forecast target area, and displaying the calculated predicted number of pick-ups on a map screen, when a magnification for displaying map information is equal to or smaller than a first magnification; and displaying demand forecast information of the forecast target area on the map screen when the magnification is equal to or larger than a second magnification that is larger than the first magnification.

With the display control method for displaying demand forecast information, the display control device, and the storage medium storing the display control program according to the disclosure, it is possible to reliably pick up a passenger who requests a dispatch of a taxi.

BRIEF DESCRIPTION OF THE DRAWINGS

Features, advantages, and technical and industrial significance of executive entities will be described below with reference to the accompanying drawings, in which like numerals, like elements, and where.

DETAILED DESCRIPTION OF EMBODIMENTS

Hereinafter, a vehicle dispatch system of an embodiment will be described with reference to the drawings.

Configuration

Figure 1:
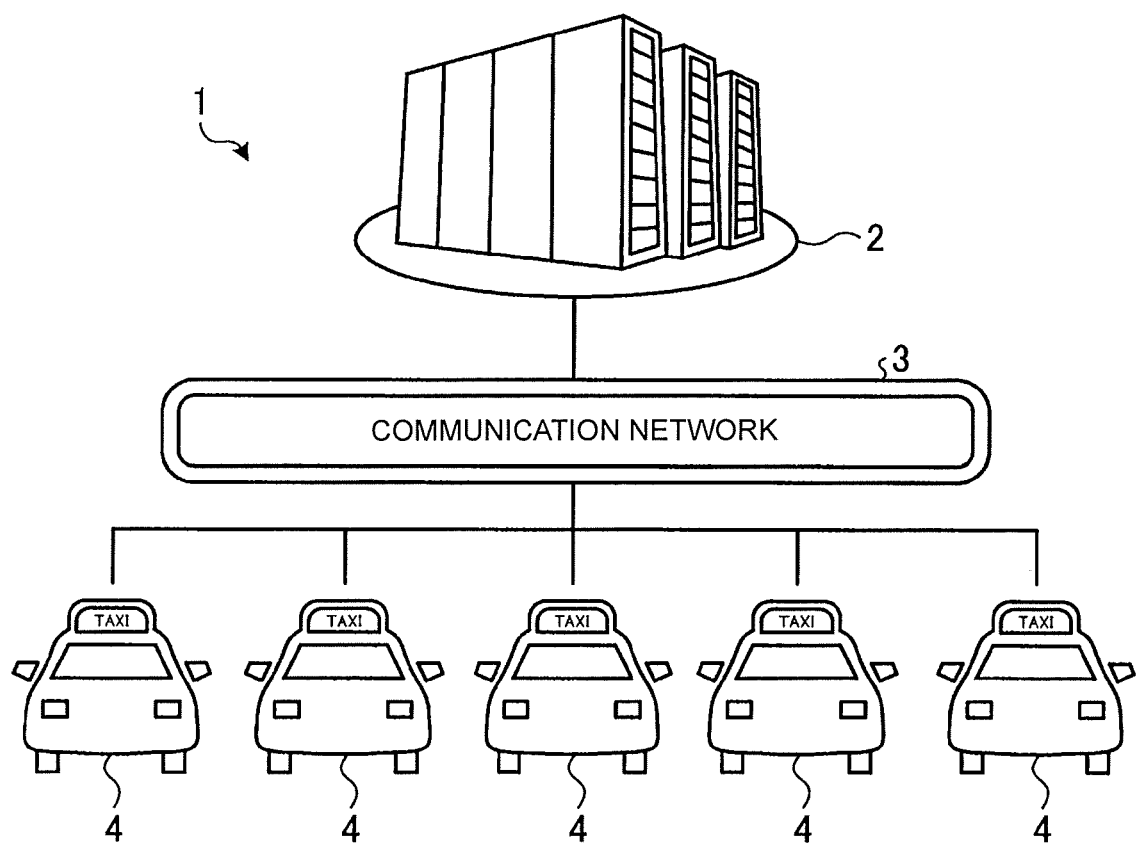
FIG. 1 is a schematic view showing a configuration of a vehicle dispatch system according to an embodiment.
Figure 2:
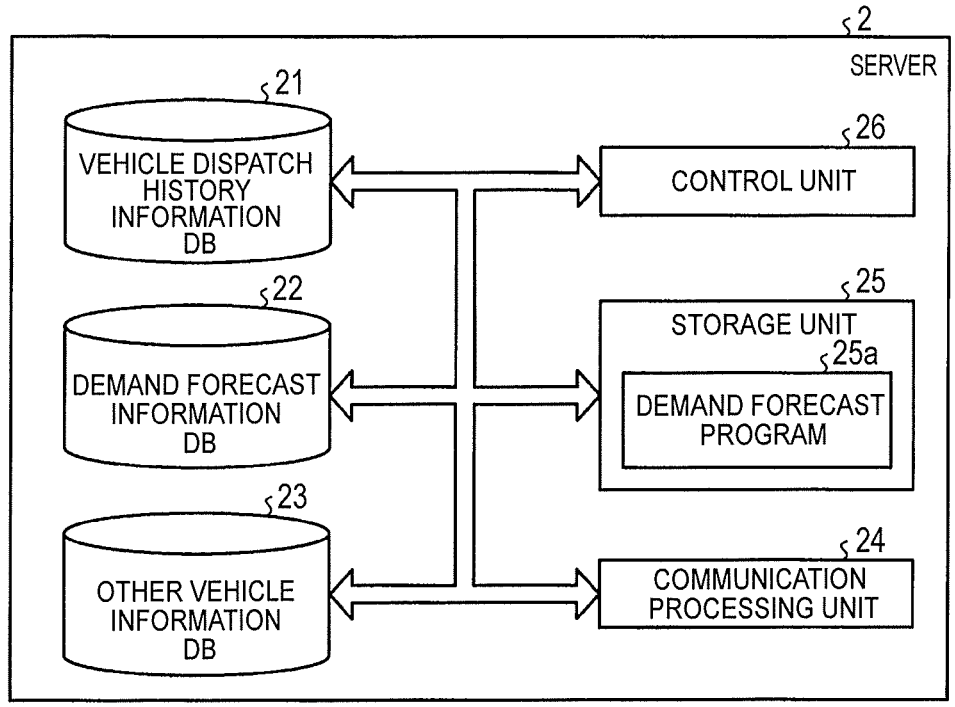
FIG. 2 is a block diagram showing a configuration of a server shown in FIG. 1.
Figure 3:
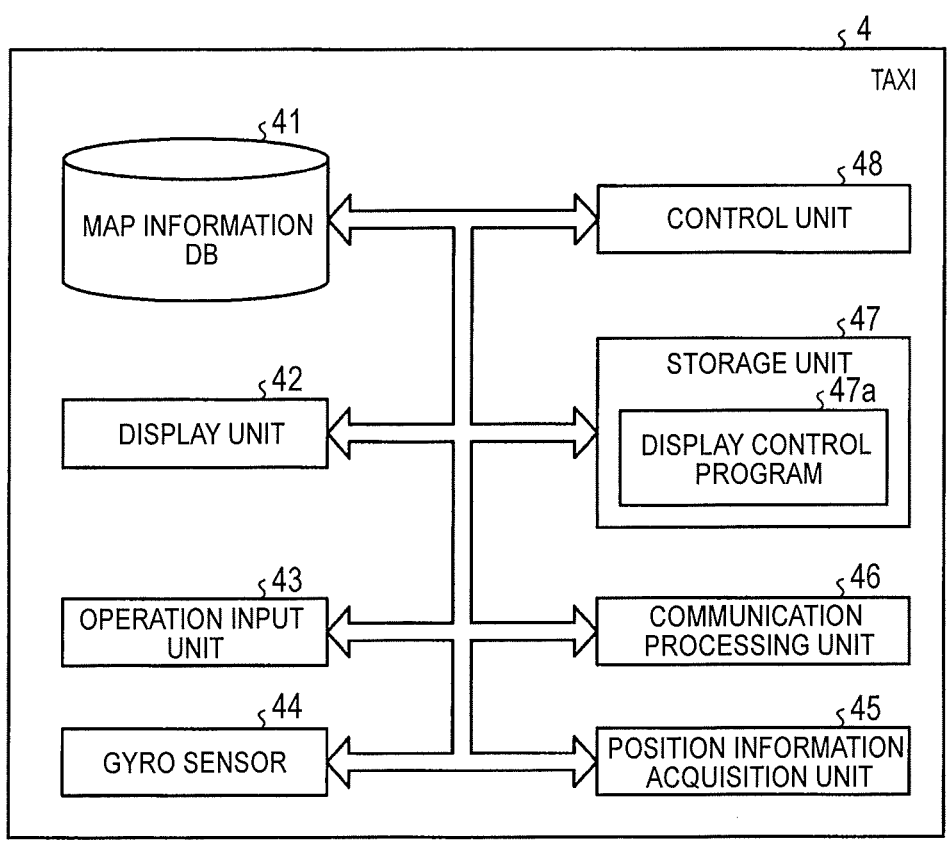
FIG. 3 is a block diagram showing a configuration of a vehicle shown in FIG. 1.

First, a configuration of the vehicle dispatch system of the embodiment will be described with reference to FIGS. 1 to 3. FIG. 1 is a block diagram showing the configuration of the vehicle dispatch system of the embodiment. FIG. 2 is a block diagram showing a configuration of a server 2 shown in FIG. 1. FIG. 3 is a block diagram showing a configuration of a taxi 4 shown in FIG. 1.

As shown in FIG. 1, the vehicle dispatch system 1 of the embodiment is an information processing system that enables taxis to be efficiently dispatched by providing taxi drivers with information on demand forecast of taxi dispatch (hereinafter referred to as demand forecast information). The vehicle dispatch system 1 includes the server 2 and the taxis 4 connected to the server 2 via a communication network 3 such as the Internet or a mobile telephone network as main constitutional elements.

As shown in FIG. 2, the server 2 includes a vehicle dispatch history information database (vehicle dispatch history information DB) 21, a demand forecast information database (demand forecast information DB) 22, an other vehicle information database (other vehicle information DB) 23, a communication processing unit 24, a storage unit 25, and a control unit 26. The server 2 may be composed of a plurality of computers, or may be a cloud server.

The vehicle dispatch history information DB 21 stores vehicle dispatch history information indicating a location where the dispatch of the taxi 4 was requested (latitude and longitude information, mesh information, information concerning administrative areas (city block) such as street name and address), time of the request, and the like.

The demand forecast information DB 22 stores demand forecast information generated by the control unit 26 in a format that is readable via the communication network 3.

The other vehicle information DB 23 stores, as other vehicle information, information on statuses (empty, coming to customers, hired, etc.) and locations of the taxis 4. The other vehicle information stored in the other vehicle information DB 23 is regularly updated by the server 2 that regularly communicates with the taxis 4 to acquire information.

The communication processing unit 24 is composed of a local area network (LAN) interface board, a wireless communication circuit for wireless communication, and the like. The communication processing unit 24 processes information communication with the taxis 4 via the communication network 3.

The storage unit 25 is composed of a recording medium fixed to a computer or the like, or a recording medium removable from the computer or the like. Examples of the recording medium fixed to a computer or the like include an erasable programmable ROM (EPROM) and a hard disk drive (HDD). Examples of the recording medium removable from a computer or the like include a universal serial bus (USB) memory, a flexible disk, a magneto-optical disk, a compact disc-read only memory (CD-ROM), a compact disc-rewritable (CD-RW), a digital versatile disc (DVD), a Blu-ray (registered trademark) disc (BD), a digital audio tape (DAT), an 8-millimeter videotape, a memory card, etc. The solid state drive (SSD) can be used as the recording medium removable from a computer or the like, or as the recording medium fixed to the computer or the like.

The storage unit 25 stores an operating system, various computer programs, various tables, various databases, and the like. In the present embodiment, the storage unit 25 stores data such as a demand forecast program 25a, which is a computer program containing a routine for generating demand forecast information, and various setting information (not shown) for generating demand forecast information. The demand forecast program 25a may be provided through download via the communication network 3.

The control unit 26 includes a processor, such as a central processing unit (CPU), a digital signal processor (DSP), or a field-programmable gate array (FPGA). and a memory (main storage unit), such as a random access memory (RAM), or a read-only memory (ROM) that are all not shown. The control unit 26 loads the computer program stored in the storage unit 25 into a work area of the main storage unit and executes the program, and controls each component through the execution of the computer program, thereby implementing a function that matches a predetermined object. In the present embodiment, by executing the demand forecast program 25a, the control unit 26 generates demand forecast information based on the vehicle dispatch history information stored in the vehicle dispatch history information DB 21. The control unit 26 may also generate demand forecast information using information on weather, events, etc. other than vehicle dispatch history information.

As shown in FIG. 3, the taxi 4 includes a map information database (map information DB) 41, a display unit 42, an operation input unit 43, a gyro sensor 44, a position information acquisition unit 45, a communication processing unit 46, a storage unit 47, and a control unit 48.

The map information DB 41 stores map information. The map information includes information on locations and shapes of roads (for example, the number of lanes on the road, types of lanes such as passing lanes and traveling lanes), location information of intersections and junctions, information on rivers, waterways, railways, etc., and information on administrative divisions such as town names and street addresses. The taxi 4 may be configured to obtain necessary map information via the communication network 3 for use.

The display unit 42 is a display device such as a liquid crystal display device or an organic electro-luminescence (EL) display device, and visually presents various information according to display control signals from the control unit 48. In the present embodiment, various information is visually presented. However, various information may be output by voice.

The operation input unit 43 includes an operation input device, such as a keyboard, a touch panel, a switch, or a microphone, and outputs an operation input signal indicating operation performed by the driver to the control unit 48 based on the operation performed by the driver of the taxi 4.

The gyro sensor 44 acquires information on a direction in which the taxi 4 is heading and outputs a signal indicating the acquired direction of the taxi 4 to the control unit 48.

The position information acquisition unit 45 receives global positioning system (GPS) signals sent from three or more GPS satellites orbiting the Earth, and measures the position of the taxi 4 based on the received GPS signals. The position information acquisition unit 45 outputs an electric signal indicating the position information regarding the measured position of the taxi 4 to the control unit 48.

The communication processing unit 46 is composed of a wireless communication circuit or the like for wireless communication. The communication processing unit 46 processes information communication with the server 2 via the communication network 3.

The storage unit 47 is configured in the same manner as the storage unit 25 of the server 2. The storage unit 47 stores an operating system, various computer programs, various tables, various databases, and the like. In the present embodiment, the storage unit 47 stores data such as a display control program 47a, which is a computer program containing a routine for controlling display of various information on the display unit 42, and various setting information (not shown) for controlling the display of various information on the display unit 42. The display control program 47a may be provided through download via the communication network 3.

The control unit 48 is configured in the same manner as the control unit 26 of the server 2. The control unit 48 loads the computer program stored in the storage unit 47 into a work area of the main storage unit and executes the program, and controls each component through the execution of the computer program, thereby realizing a function that matches a predetermined object. A display control device includes the storage unit 47 (i.e., memory) and the control unit 48 (i.e., a hardware processor).

In the vehicle dispatch system 1 having the configuration described above, the control unit 48 of the taxi 4 can execute the display control process described below so as to reliably pick up a passenger who requests a dispatch of a taxi. Operation of the control unit 48 executing the display control process will be described below with reference to FIGS. 4 to 6.

Display Control Process

Figure 4:
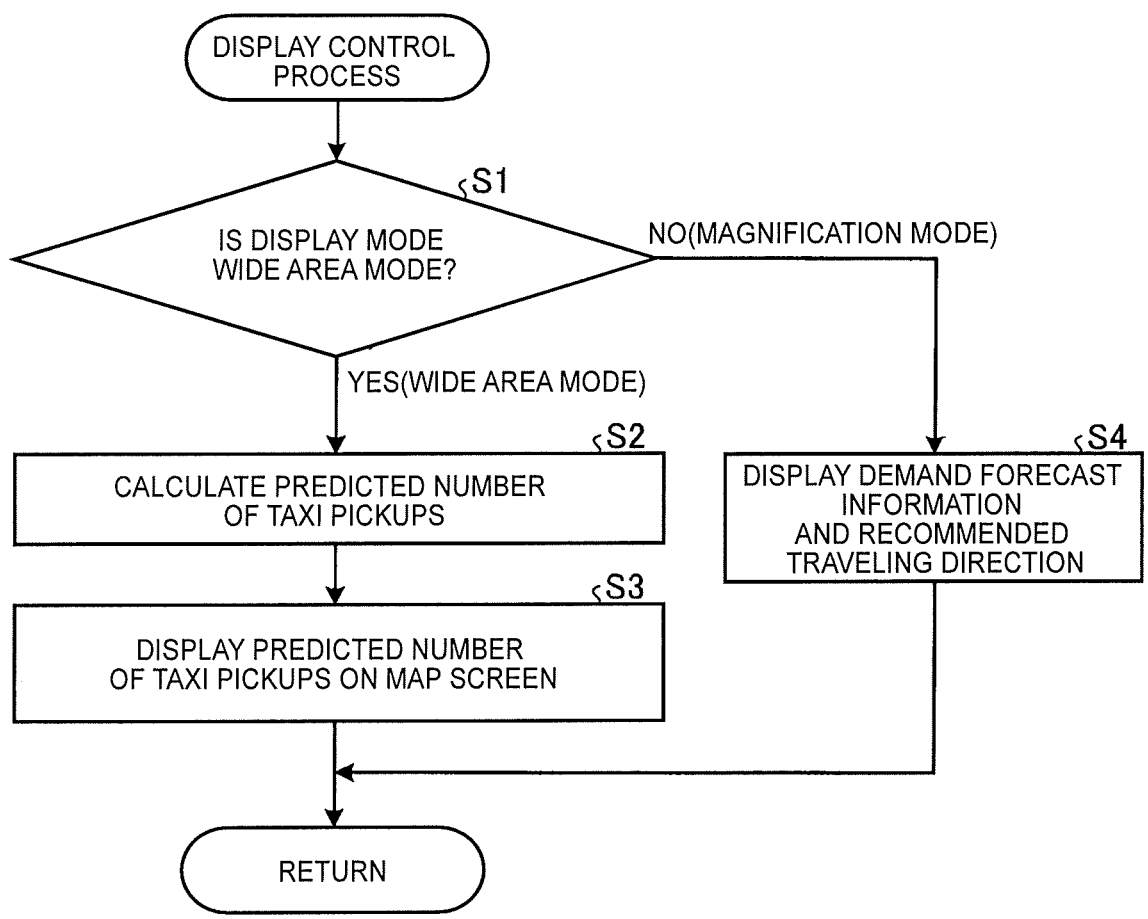
FIG. 4 is a flowchart showing a display control process of an embodiment.
Figure 5:
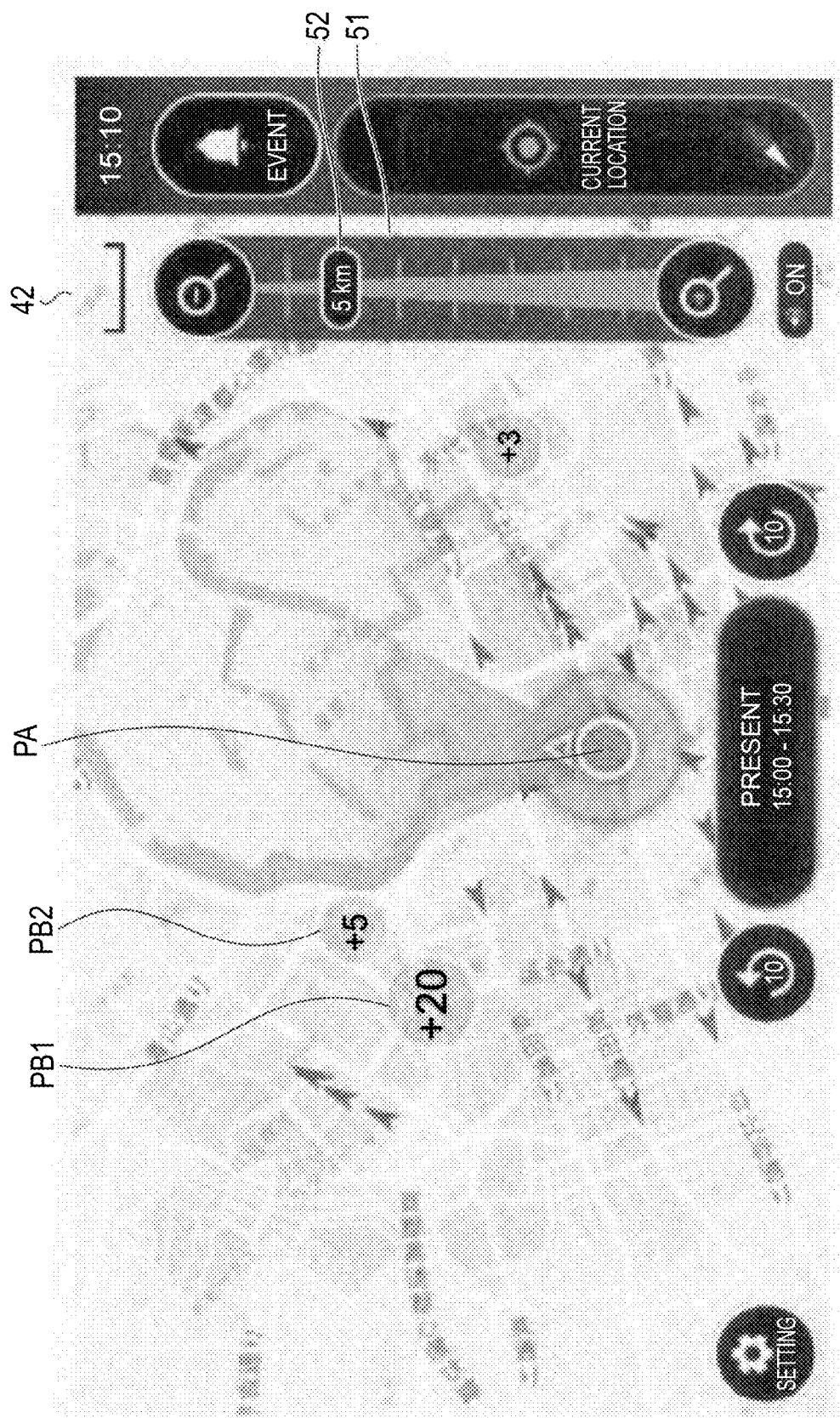
FIG. 5 is a diagram showing a display example of demand forecast information.
Figure 6:
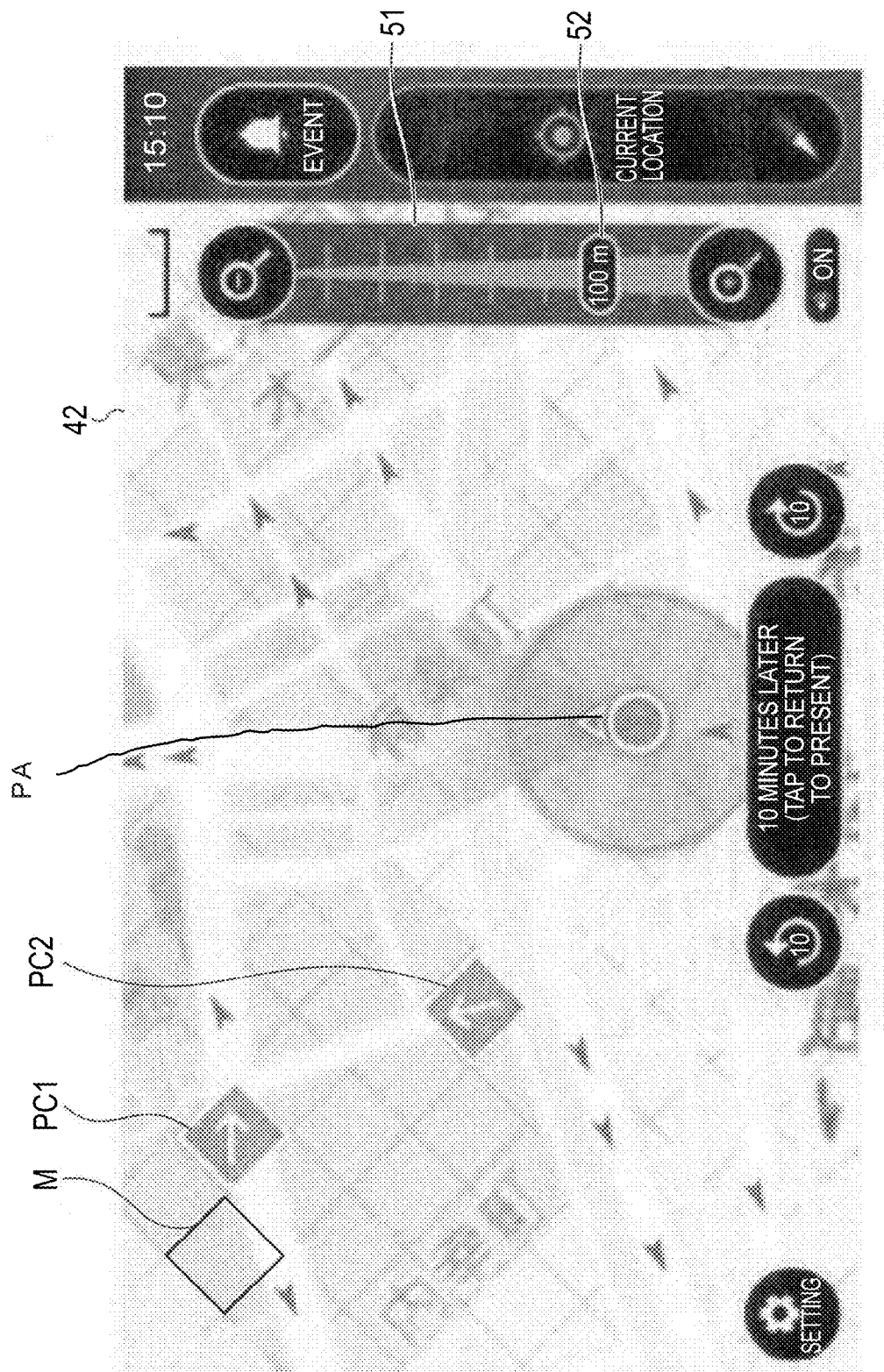
FIG. 6 is a diagram showing a display example of demand forecast information.

FIG. 4 is a flowchart showing a display control process according to the embodiment. FIG. 5 and FIG. 6 are diagrams showing display examples of demand forecast information.

As shown in the flowchart of FIG. 4, the display control process starts at the timing when the driver of the taxi 4 operates the operation input unit 43 to instruct the display unit 42 to display demand forecast information, and proceeds to step S1. The display control process is repeatedly executed every predetermined control cycle until an instruction to end the display control process is issued. Also, the functions of the control unit 48 described below are realized by the control unit 48 executing the display control program 47*a*.

In step S1, the control unit 48 determines whether a display mode of a map screen displayed on the display unit 42 is a wide area mode in which a magnification is equal to or smaller than a first magnification. When the control unit 48 determines that the display mode is the wide area mode (step S1: Yes), the control unit 48 causes the display control process to proceed to step S2. When the control unit 48 determines that the display mode is not the wide area mode (step S1: No), the control unit 48 determines that the display mode is a magnification mode in which the magnification is equal to or larger than a second magnification that is larger than the first magnification. Then, the display control process proceeds to step S4. The display mode of the map screen can be switched by the driver operating the operation input unit 43. In addition, the control unit 48 may switch the display mode of the map screen from the wide-area mode to the magnification mode at the timing when a host vehicle enters a high demand area and/or a range of a predetermined distance from a destination set by a route guidance device or the like.

In step S2, first, the control unit 48 acquires information on the direction of the host vehicle from the gyro sensor 44, and acquires position information of the host vehicle from the position information acquisition unit 45. Next, based on the acquired information, the control unit 48 sets an area for which acquisition of demand forecast information is required (forecast target area). The control unit 48 transmits information regarding the forecast target area to the control unit 26 via the communication network 3. Next, the control unit 26 reads demand forecast information corresponding to the forecast target area from the demand forecast information DB 22 and information on the statuses and the positions of other taxis 4 (other vehicles) located in the forecast target area from the other vehicle information DB 23. Next, the control unit 26 transmits the read information to the control unit 48 via the communication network 3. Next, the control unit 48 uses the received information to calculate a predicted number of pick-ups within each of the predetermined ranges in the forecast target area. Here, the predicted number of pick-ups means the number of times taxis 4 can pick up passengers within a predetermined range, and is calculated by subtracting the number of vacant taxis 4 (including taxis operated by own company and taxis operated by other companies) from the predicted number of requests (required number of vehicles) within the predetermined range. The control unit 48 may calculate the predicted number of pick-ups in consideration of a travel time of the host vehicle until the host vehicle reaches the predetermined range. Thus, step S2 is completed, and the display control process proceeds to step S3.

In step S3, the control unit 48 reads the map information of the forecast target area from the map information DB 41, and displays the read map information as the map screen on the display unit 42 as shown in FIG. 5. Further, the control unit 48 displays a host vehicle icon PA indicating the direction and the position of the host vehicle based on the information acquired from the gyro sensor 44 and the position information acquisition unit 45 in step S2 at a corresponding position on the map screen. Then, without displaying detailed demand forecast information, the control unit 48 displays predicted ride icons PB1, PB2 at corresponding positions on the map screen. The predicted ride icons PB1, PB2 each indicate the predicted number of pick-ups, which is calculated in step S2.

When the predicted number of pick-ups is equal to or larger than a predetermined threshold value, the control unit 48 may change the form (size, color, etc.) in which the predicted ride icons is displayed. Further, as shown in FIG. 5, the display unit 42 displays a scaling icon 51 for an operation of scaling up and down the map screen. Thus, the driver can instruct scaling up or down of the map screen by operating the operation button 52 of the scaling icon 51 using the operation input unit 43. The control unit 48 changes the display mode of the map screen in accordance with the driver's instruction. Thus, step S3 is completed, and the display control process returns to step S1.

In step S4, first, the control unit 48 acquires information on the direction of the host vehicle from the gyro sensor 44, and acquires position information of the host vehicle from the position information acquisition unit 45. Next, based on the acquired information, the control unit 48 sets a forecast target area. The control unit 48 transmits information regarding the forecast target area to the control unit 26 via the communication network 3. Next, the control unit 26 reads the demand forecast information corresponding to the forecast target area from the demand forecast information DB 22 and transmits the read demand forecast information to the control unit 48 via the communication network 3.

Next, the control unit 48 reads the map information of the forecast target area from the map information DB 41, and displays the read map information as a map screen on the display unit 42 as shown in FIG. 6. Further, as shown in FIG. 6, the control unit 48 displays the host vehicle icon PA indicating the direction and position of the host vehicle based on the information acquired from the gyro sensor 44 and the position information acquisition unit 45 at the corresponding position on the map screen. Then, as shown in FIG. 6, the control unit 48 displays, in mesh units M, the received demand forecast information at the corresponding position on the map screen, and displays recommended traveling direction icons PC1, PC2 indicating the recommended traveling directions of the host vehicle at corresponding positions on the map screen. The recommended traveling direction of the host vehicle can be determined, for example, by calculating a route for early arrival at the high demand area based on demand forecast information. In the high demand area, the control unit 48 may display demand forecast information in mesh units M that are smaller in size than the normal mesh units M. Thus, the process of step S4 is completed, and the display control process returns to step S1.

The broader aspects of the disclosure are not limited to the specific details and the representative embodiment presented and described above. Accordingly, various modifications may be made without departing from the scope of the general inventive concept as defined by the appended claims and their equivalents.

What is claimed is:

1. A display control method for displaying demand forecast information, the method comprising:
    calculating a predicted number of pick-ups based on demand forecast information and vacant taxi information of a forecast target area, and displaying the calculated predicted number of pick-ups on a map screen, when a magnification for displaying map information is equal to or smaller than a first magnification, a font of the calculated predicted number of pick-ups displayed on the map screen being directly proportional in size to the calculated predicted number of pick-ups; and
    displaying the demand forecast information of the forecast target area on the map screen as shaded mesh units, when the magnification is equal to or larger than a second magnification that is larger than the first magnification,
    wherein a size of the mesh units in a high demand area is smaller than a size of the mesh units in a low demand area that has a demand lower than the high demand area.

2. The method according to claim 1, further comprising switching the magnification from the first magnification to the second magnification at a timing when a host vehicle enters a high demand area and/or a range of a predetermined distance from a destination.

3. The method according to claim 1, further comprising displaying a recommended traveling direction of a host vehicle in accordance with a demand forecast, when the magnification is equal to or larger than the second magnification.

4. A display control device for displaying demand forecast information comprising:
    a memory; and
    a hardware processor, wherein:
    the hardware processor is configured to calculate a predicted number of pick-ups based on demand forecast information and vacant taxi information of a forecast target area, and displaying the calculated predicted number of pick-ups on a map screen, when a magnification for displaying map information is equal to or smaller than a first magnification, a font of the calculated predicted number of pick-ups displayed on the map screen being directly proportional in size to the calculated predicted number of pick-ups; and
    the hardware processor is configured to display demand forecast information of the forecast target area on the map screen as shaded mesh units when the magnification is equal to or larger than a second magnification that is larger than the first magnification,
    wherein a size of the mesh units in a high demand area is smaller than a size of the mesh units in a low demand area that has a demand lower than the high demand area.

5. A non-transitory storage medium storing a display control program that, when executed by a computers, causes the computer to perform a method for displaying demand forecast information comprising: calculating a predicted number of pick-ups based on demand forecast information and vacant taxi information of a forecast target area, and displaying the calculated predicted number of pick-ups on a map screen, when a magnification for displaying map information is equal to or smaller than a first magnification, a font of the calculated predicted number of pick-ups displayed on the map screen being directly proportional in size to the calculated predicted number of pick-ups; and
    displaying demand forecast information of the forecast target area on the map screen as shaded mesh units when the magnification is equal to or larger than a second magnification that is larger than the first magnification,
    wherein a size of the mesh units in a high demand area is smaller than a size of the mesh units in a low demand area that has a demand lower than the high demand area.

6. The method according to claim 1, wherein the calculated predicted number of pick-ups is displayed in a circle and a diameter of the circle is directly proportional to the calculated predicted number of pick-ups.

7. The method according to claim 6, wherein the circle is located on the map screen at a location of the forecast target area.

* * * * *